United States Patent
Annerstedt et al.

[11] Patent Number: 5,361,984
[45] Date of Patent: Nov. 8, 1994

[54] DEVICE FOR SELECTIVE CLIMATE CONTROL IN VEHICLE CABINS

[75] Inventors: Claes Annerstedt, Askim; Per Frid, Malmo; Bengt Johansson; Thomas Sahlmen, both of Goteborg, all of Sweden

[73] Assignee: AB Volvo, Sweden

[21] Appl. No.: 966,173

[22] PCT Filed: Jul. 15, 1991

[86] PCT No.: PCT/SE91/00493

§ 371 Date: Mar. 26, 1993

§ 102(e) Date: Mar. 26, 1993

[87] PCT Pub. No.: WO92/01580

PCT Pub. Date: Feb. 6, 1992

[30] Foreign Application Priority Data

Jul. 26, 1990 [SE] Sweden ............... 9002506-5

[51] Int. Cl.$^5$ ............................ G05D 23/00
[52] U.S. Cl. ................... 236/49.3; 236/1 B; 165/42
[58] Field of Search .......... 236/1 B, 49.3, 91 F, 236/78 D; 165/22, 42, 30, 36, 43; 62/243, 244

[56] References Cited

U.S. PATENT DOCUMENTS

| | | | |
|---|---|---|---|
| 4,473,109 | 9/1984 | Kojima et al. | 62/244 X |
| 4,649,709 | 3/1987 | Kagohata et al. | 236/49.3 X |
| 4,757,944 | 7/1988 | Kagohata et al. | 236/49.3 X |
| 4,759,269 | 7/1988 | Brown et al. | 98/2.01 |
| 4,856,710 | 8/1989 | Takada et al. | 236/1 B X |
| 4,899,930 | 2/1990 | Kagohata et al. | 236/91 F |

FOREIGN PATENT DOCUMENTS

| | | |
|---|---|---|
| 2608520 | 6/1988 | France. |
| 3215293 | 10/1982 | Germany. |
| 58-188714 | 11/1983 | Japan. |
| 59-59517 | 4/1984 | Japan. |
| 457574 | 1/1989 | Sweden. |

*Primary Examiner*—Harry B. Tanner
*Attorney, Agent, or Firm*—Lerner, David, Littenberg, Krumholz & Mentlik

[57] ABSTRACT

Device for selective climate control in vehicle cabins having a first air-vent duct (18) and a second air-vent duct (22) on respective sides or different zones in a vehicle cabin. The duct temperature on each side is measured and the duct adjustment is regulated by inner feedback control circuits. The cabin temperature (Tc1, Tc2 resp.) on both sides is measured, preferably at approximately head level, and fed to outer control circuits which determine the desired duct temperature as the deviation between the desired cabin temperatures (Tcs1, Tcs2 resp.) set by means of separate control knobs (38, 44) and the measured cabin temperatures (Tc1, Tc2 resp.). Desired duct temperature signals (Dts1, Dts2 resp.) are connected as input signals to respective inner control circuits.

9 Claims, 3 Drawing Sheets

DEVICE FOR SELECTIVE CLIMATE CONTROL IN VEHICLE CABINS

TECHNICAL FIELD

The present invention relates to a device for selective climate control in vehicle cabins.

BACKGROUND OF THE INVENTION

In order to offer all the occupants of a vehicle the highest possible comfort, it is desirable to be able to offer the passenger as well as the driver the possibility to set the cabin temperature. In other words it is desirable to have the possibility to maintain different temperatures in separate parts of the same cabin.

U.S. Pat. No. 4,759,269 shows a system in which the air conditioning, in this case temperature and air flow velocity, for the driver's and passenger's side respectively in a motor vehicle is regulated by means of separate control panels. The temperature in the cabin is determined by an interior temperature sensor. The disadvantage with this system is that the lack of separate and effectively placed temperature sensors seriously affects the possibility to regulate the temperature automatically; the system does not measure the temperatures where respective occupants sit and sense the cabin climate. The system according to Swedish document SE-457574 also makes use of a single temperature sensor and accordingly displays the same disadvantages.

Improved attempts to achieve separate climate control are described in the Japanese patent JP 59-59517 and in the French patent FR 2608520. These systems make use of a better placement of temperature sensors in the cabin, at head level, though the temperature at head level is an insufficient measure of the temperature around the driver or the passenger. The Japanese document JP 58188714 and the German document DE 3215293 describe systems which comprise temperature sensors placed in the air-vent and in the cabin on respective cabin sides. Despite separate temperature measuring, neither of these systems have separate regulators and can therefore not compensate for different temperature changes on the driver and passenger sides respectively in an independent manner.

The object of the present invention is accordingly to provide a device which permits automatic precise and substantially independent climate control in separate regions in a vehicle's cabin.

SUMMARY OF THE INVENTION

The invention provides a device for selective climate control in vehicle cabins. A first air-vent duct is positioned in a in a first zone of a vehicle cabin and a second air-vent duct is positioned in a second zone. A temperature sensor is positioned in each air-vent duct. For each duct, a separate knob or other adjustment device is provided so that the user can regulate the temperature from each duct individually. Inner and outer feedback circuits are provided for each duct to regulate the temperature in accordance with the individually adjusted temperature. The invention further includes a single air supply device for supplying air to both the first and second air-vent ducts.

The invention may also include separate temperature sensors to measure the temperature in the different zones in the vehicle's cabin. The signals from these sensors are used as feedback signals to the feedback circuits. The feedback circuits preferably include PID-regulators.

DESCRIPTION OF A PREFERRED EMBODIMENT

The invention will be described by way of example only as being suitable for achieving separate regulation of the temperature on the driver's side and the passenger side respectively of a passenger vehicle cabin. This is, however, not essential and as will become apparent below the invention is equally applicable when it is desirable to have another region or zone in the cabin, for example the front and rearseat, or where the number of temperature regions is to be greater than two.

Figure 1:
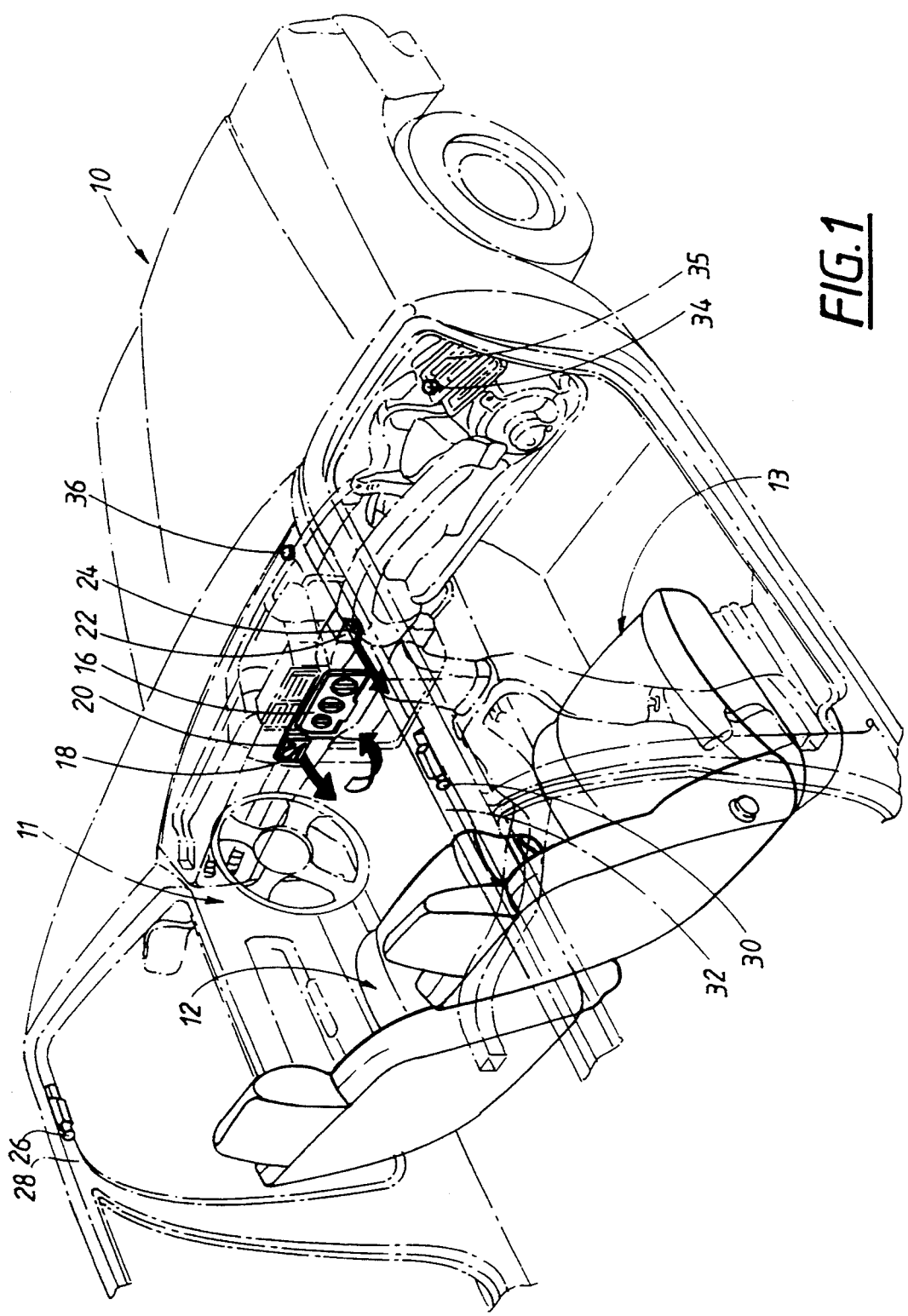
FIG. 1 is a simplified partially sectioned perspective view of a cabin in a vehicle.

In FIG. 1, a vehicle and its cabin are generally denoted by reference Nos. 10 and 11 respectively. In this embodiment the interior 11 is divided into a driver's side 12 and a passenger side 14. In FIG. 1, these sides are shown in a left hand drive passenger vehicle, but the invention is of course equally applicable to right hand drive vehicles. A control unit 16 is provided in a normal manner so that it is easily accessible for the driver and preferably also the passenger.

The temperature in the cabin 11 is regulated via the inlet and circulation of heated or cooled air (denoted by large arrows). The air to the driver's side flows out through an air-vent duct 18 positioned on the left hand side and in which a temperature sensor 20 is located; air to the passenger side flows out through a duct 22 on the right hand side and in which a temperature sensor 24 is arranged.

A temperature sensor 26 for the left side is preferably located in an upper part of the vehicle's left door frame 28, in order to be approximately at the driver's head level. A temperature sensor 30 for the right side is preferably provided in an upper part of the vehicle's right door frame 32, in order to be approximately at head level with the passenger. An ambient temperature sensor 34 is preferably located in an outer air intake 35 of the vehicle, or at another location where the temperature differs insignificantly from the temperature in the vehicle's surroundings. One or more solar sensors 36 are arranged in the cabin, preferably just inside the windscreen or above the dashboard.

Figure 2:
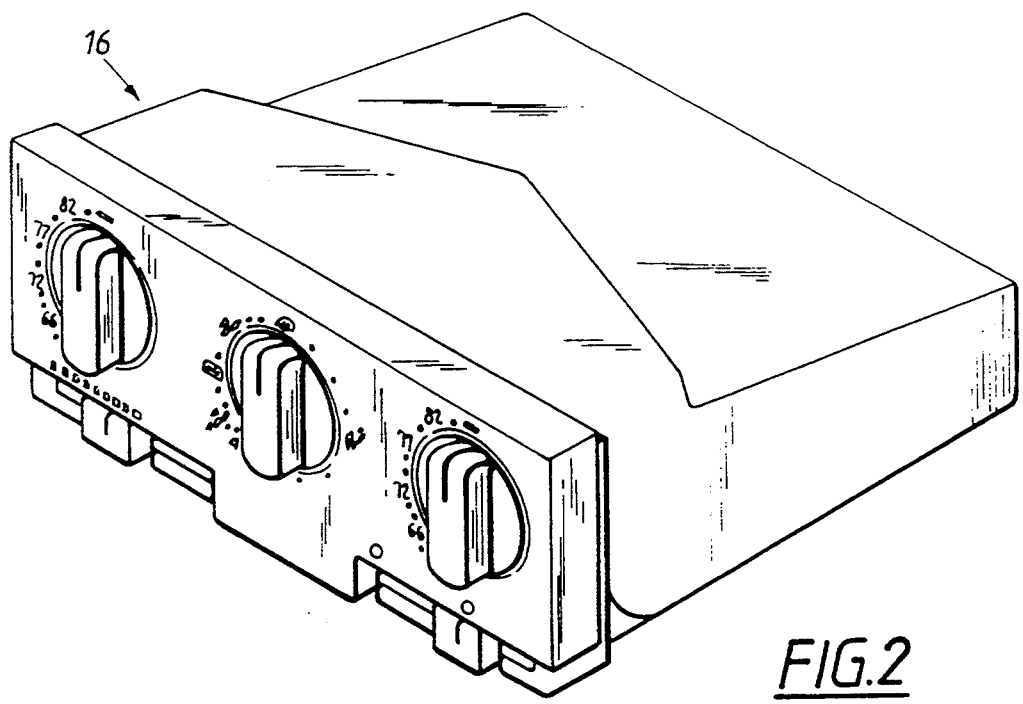
FIG. 2 is a perspective view of one example of a control unit according to the invention.

An example of the shape of the control unit 16 is shown in FIG. 2. The control unit 16 preferably houses all the control electronics according to the invention; alternatively, the control unit 16 can form only the data input unit to a not shown master microprocessor.

Figure 3:
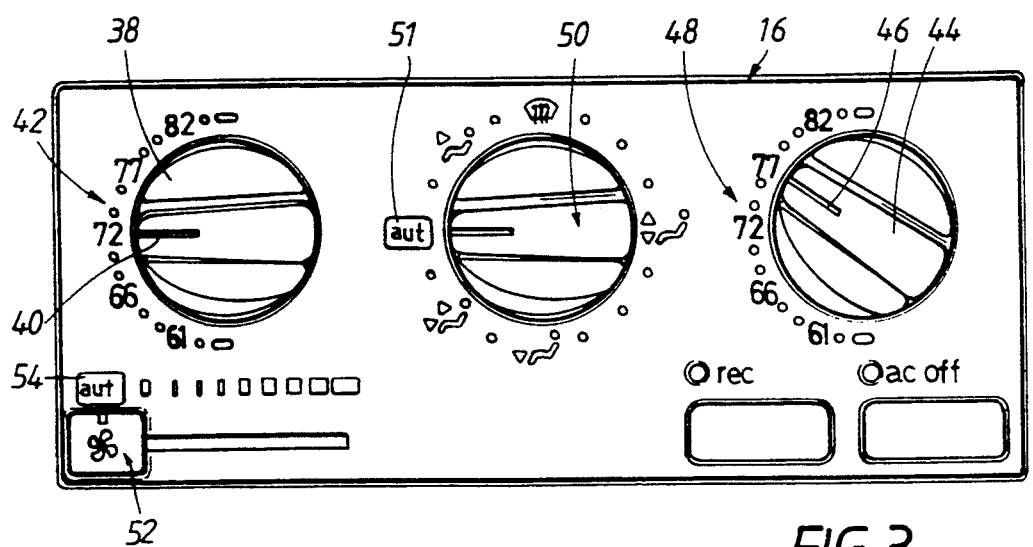
FIG. 3 is a front view of the control unit in which examples of controls for controlling the temperature in various parts of the cabin are illustrated.
Figure 4:
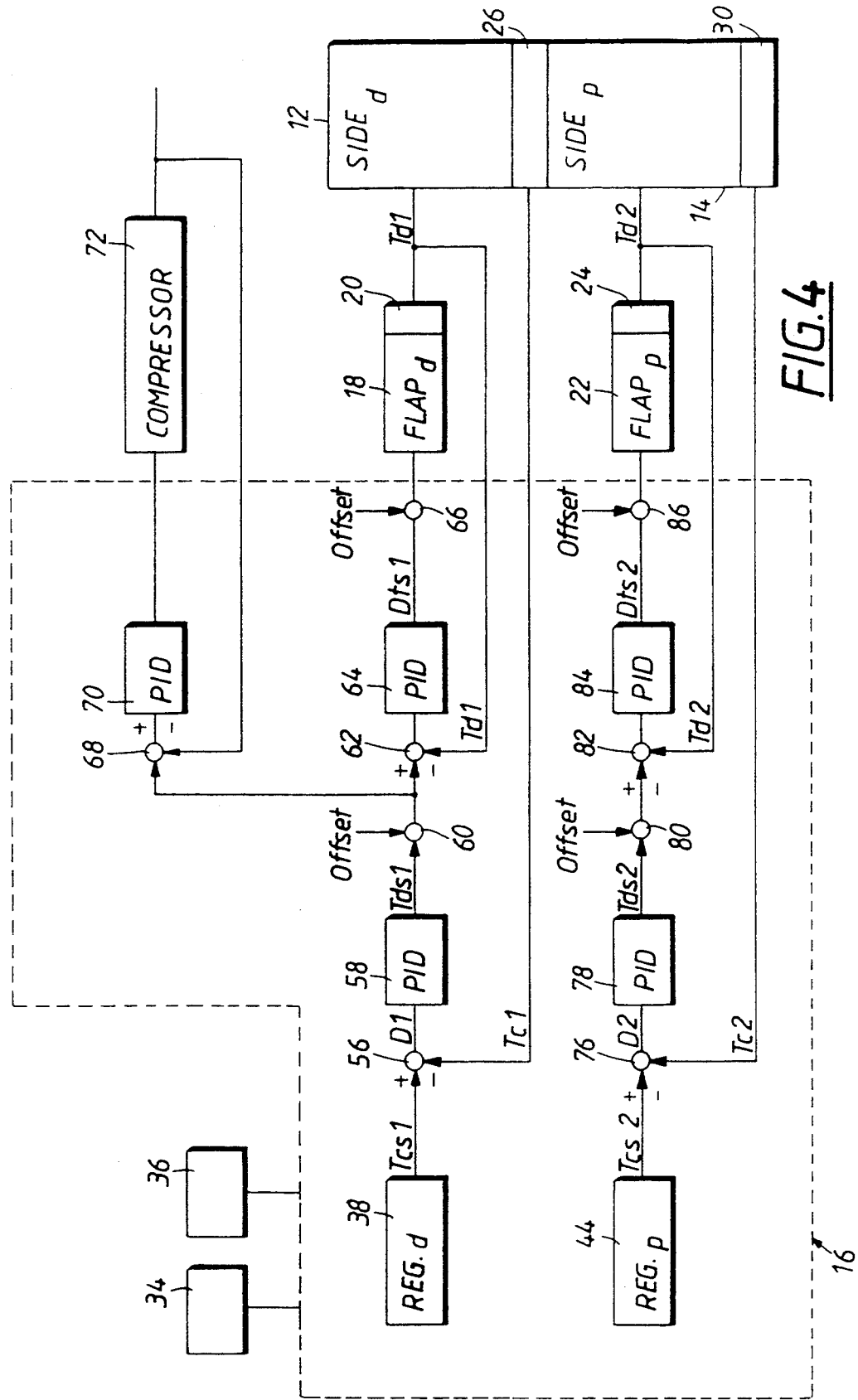
FIG. 4 is a block diagram of control circuits for the driver and the passenger side respectively in the vehicle cabin.

FIG. 3 shows an example of the layout of various control knobs of the control unit 16. A temperature control knob 38 for the driver's side is provided with a marker 40, whereby the desired cabin temperature is set by rotating the control knob 38 such that the marker points towards the desired temperature on a suitable scale 42. In the shown example the scale is divided into degrees Fahrenheit, though other scales can of course be used instead. A temperature control knob 44 for the passenger side is essentially identical to the control knob 38 and has a marker 46 and a corresponding scale 48. The control knobs 38 and 44 can be moved independently.

The control unit 16 preferably also includes a function selector 50. Such function selectors for setting the desired heating or cooling function are common in modern cars. In the preferred embodiment, however, the function selector 50 also includes an automatic position (with a corresponding indication 51) which is selected when automatic air distribution according to the invention is desired. This occurs according to predetermined functions, with regard to, for example, the outer temperature and sun intensity. The desired temperature is thus regulated automatically, independent of the position of the selector 50. The control unit 16 may also include a fan control switch 52 of common type, though also with an automatic position (with a corresponding indication 54) which is selected when automatic fan control according to the invention is desired.

The control electronics according to the invention include two substantially identical circuits, a first control circuit for the driver's side and a second control circuit for the passenger side.

The driver's temperature control knob 38 provides a first electrical desired temperature signal Tcs1 which is proportional to the temperature which the driver desires on his side of the cabin. This signal Tcs1 is fed to an addition input of a summator 56. A first electrical cabin temperature signal Tc1 (which will be explained in more detail below) is connected to a subtraction input of the summator 56. The output signal from the summator 56 provides a first error signal D1, which is connected as the input signal to a first outer regulator 58. In the preferred embodiment the first regulator 58 consists of a known PID-regulator, though other regulators can also be used and the differentiating function of the PID-regulator can be omitted if so desired.

The output signal from the regulator 58 constitutes a first desired signal for the vent duct temperature Tds1 which is added to the predetermined offset signal of a summator 60. The difference between the output signal from the summator 60 and a first air duct temperature signal Td1 is then formed in a summator 62. The output signal from the summator 62 corresponds accordingly to the deviation of the duct's 18 air temperature from its desired temperature, which is determined by the PID-regulator 58 together with the offset signal to the summator 60. The output signal from the summator 62 is connected as the input signal to a first inner PID-regulator 64. The output signal Dts1 from the regulator 64 is then added in a summator 66 to a predetermined offset signal, and the output signal from the summator 66 is connected as a position adjustment signal to the duct 18. The adjustment of the duct 18 thus determines the temperature of the air flow to the driver's side of the cabin and the temperature sensor 20 gives the duct temperature signal Td1, which is proportional to the temperature in the duct 18. The temperature sensor 26 measures the temperature in the cabin as has been described above and gives the first desired temperature signal Tcs1.

The first control circuit accordingly includes 1) an inner feed-back control circuit with unit feedback from the duct temperature sensor and with a PID-regulator in the forward connection path for adjustment of the duct as a function of the error in the duct temperature; and 2) an outer feedback control circuit with unit feedback and with both an outer PID-regulator for generating a desired signal for the duct temperature and the inner feedback control circuit in the forward connection path.

According to a conceivable embodiment, a compressor drive circuit is also driven from the first control circuit, whereby the output signal from the summator 60 (the absolute desired value signal for the duct temperature) is connected to an addition input of a summator 68 to form the desired value signal to a PID-regulator 70. The PID-regulator 70, in a known manner, gives control signals to a compressor 72, whose function is measured in a known manner and fed back to a subtraction input of the summator 68. The compressor 72 determines the temperature of the air flow to the vent duct 18 and 22.

The second control circuit is in its form and function essentially identical to the first, though instead controls the temperature on the passenger side and is not directly connected to a compressor drive circuit.

The passenger temperature control knob 44 provides a second electrical desired temperature value signal Tcs2, which is proportional to the temperature which the passenger desires on his side of the cabin. This signal Tcs2 is connected to an addition input of a summator 76. A second electrical cabin temperature signal Tc2 (which will be explained in more detail below) is connected to a subtraction input of the summator 76. The output signal from the summator 76 constitutes a second error signal D2, which is connected as the input signal to a second outer regulator. In the preferred embodiment the second regulator 78 consists of a known PID-regulator, though other regulators can also be used and the differentiating function of the PID-regulator can be omitted if so desired.

The output signal from the regulator 78 constitutes a second desired value signal for the duct temperature Tds2, which is added to a predetermined offset signal of a summator 80. The difference between the output signal from the summator 80 and a second duct temperature signal Td2 is then formed in a summator 82. The output signal the summator 82 corresponds accordingly to the deviation of the duct's 22 air temperature from its desired temperature which is determined by the PID-regulator 78 together with the offset signal to the summator 80. The output signal from the summator 82 is connected as the input signal to a second inner PID-regulator 84. The output signal Dts2 from the regulator 84 is then added in a summator 86 to a predetermined offset signal and the output signal from the summator 86 is connected as a position adjustment signal to the duct 22. The adjustment of the duct 22 then determines the temperature of the air flow to the passenger side of the cabin and the temperature sensor 24 gives the duct temperature signal Td2, which is proportional to the temperature in the duct 22. The temperature sensor 30 measures the temperature in the cabin as has been described above and gives the second temperature signal Tcs2.

The second control circuit accordingly includes 1) an inner feedback control circuit with unit feedback from the duct temperature sensor and with a PID-regulator in the forward connection path for adjustment of the duct as a function of the error in the duct temperature; and 2) an outer feedback control circuit with unit feedback and with an outer PID-regulator for generating a desired value signal for the duct temperature.

In a further developed embodiment of the invention, the ambient temperature is measured by the sensor 34 and/or the sun strength by sun sensors 36. Output signals from these components are connected as input signals to processor electronics in the control unit 16 for conversion in a known manner to offset signals for the desired value signals Tcs1 and Tcs2. In this manner the system according to the invention can compensate for, for example temperature increase due to strong sunlight even if it is cold outside the vehicle.

According to the invention it is therefore not just the duct or cabin temperature on each side which is measured, but both, and these values are used in a single control circuit for each air duct. The system according to the invention thus permits totally separate temperature control for the driver and the passenger and achieves more accurate control by means of employing temperature measurements in both respective air vents and from respective head levels.

The regulators and summators included in the invention do not of course need to be analogue, but all or certain of these components can be implemented digitally. Other variations of the invention than those which have been mentioned above are also imaginable and the invention is restricted only by the appended claims. For example the compressor drive circuit and the engine revolution and compressor pressure sensors can be excluded.

We claim:

1. A device for selective climate control in vehicle cabins, comprising
   a first air-vent duct in a first zone of a vehicle cabin and a second air-vent duct in a second zone of the vehicle cabin;
   a first temperature sensor to emit a first duct temperature signal (Td1) corresponding to the temperature in the first air-vent;
   a second temperature sensor to emit a second duct temperature signal (Td2) corresponding to the temperature in the second air-vent duct;
   a single air supply means for supplying air to both the first and second air-vent ducts;
   first adjustment means for adjustment of a first desired temperature for the first zone;
   second adjustment means for adjustment of a second desired temperature for the second zone;
   a first feedback inner control circuit for temperature control with help of the first duct;
   a first feedback outer control circuit, which has a first main forward connection path, for determining a first desired temperature signal (Tds1) which constitutes a first input signal to the first feedback inner control circuit,
   said first feedback inner control circuit being arranged in the first main forward connection path;
   a second feedback inner control circuit for temperature control with help of the second duct;
   a second feedback outer control circuit, which has a second main forward connection path, for determining a second desired temperature signal (Tds2) which constitutes a second additive input signal to the second feedback inner control circuit,
   said second feedback inner control circuit being arranged in the second main forward connection path;
   said first adjustment means being connected to said first outer control circuit for generating a first set temperature signal (Tcs1); and
   said second adjustment means being connected to said second outer control circuit for generating a second set temperature signal (Tcs2).

2. A device according to claim 1, further including
   a first temperature sensor to emit a first cabin temperature signal (Tc1) corresponding to the temperature in the first zone; and
   a second temperature sensor to emit a second cabin temperature signal (Tc2) corresponding to the temperature in the second zone;
   said first main forward connection path including a first outer regulator before and in series with the first inner control circuit;
   said first outer control circuit having a first outer feedback path with negative unit amplification of the first cabin temperature signal (Tc1) for addition to the first set temperature signal (Tcs1);
   said second main forward connection path including a second outer regulator before and in series with the second inner control circuit; and
   said second outer control circuit having a second outer feedback path with negative unit amplification of the second cabin temperature signal (Tc2) for addition to the second set temperature signal (Tcs2).

3. A device according to claim 2, wherein
   the first inner control circuit has a first inner forward connection path in which a first inner regulator is connected before and in series with the first air-vent duct and the first temperature sensor and has a first inner feedback path with negative unit amplification of the first duct temperature signal (Td1); and
   the second inner control circuit has a second inner forward connection path in which a second inner regulator is connected before and in series with the second air-vent duct and the second temperature sensor and has a second inner path with negative unit amplification of the second duct temperature (Td2).

4. A device according to claim 3, wherein the first inner and the first outer regulators and the second inner and the second outer regulators are PID-regulators.

5. A device according to claim 1, further including
   a first outer summator for addition of a first outer offset signal to the first set temperature signal (Tds1); and
   a second outer summator for addition of a second outer offset signal to the second set temperature signal (Tds2).

6. A device according to claim 3, further including
   a first inner summator for addition of a first inner offset signal to a first inner output signal (Dts1) from the first inner regulator; and
   a second inner summator for addition of a second inner offset signal to a second inner output signal (Dts2) from the second inner regulator.

7. A device according to claim 1, further including
   an ambient temperature sensor connected to processor electronics to form an offset value for the first and second desired temperature signals (Tcs1, Tcs2 resp.) with regard to the temperature in the vehicle's surroundings.

8. A device according to claim 1, further including a sun sensor arranged in the vehicle interior and connected to processor electronics to form an offset value to the first and second temperature signals (Tcs1, Tcs2 resp.) with regard to the solar energy entering the vehicle cabin.

9. A device according to claim 1, wherein an input to a compressor control circuit is connected to the first outer main connection path after the first outer regulator for regulating an electrical variable compressor for supplying air to the first and second air-vent ducts.

* * * * *